July 29, 1924.

Re. 15,880

H. B. HARTMAN

OZONE GENERATOR

Original Filed Oct. 11, 1921 3 Sheets-Sheet 1

Inventor

H. B. Hartman,

WITNESSES:-

Chas. L. Griesbauer

Emory A. Groff

By S. P. Wolhandler

Attorney

July 29, 1924.
H. B. HARTMAN
Re. 15,880
OZONE GENERATOR
Original Filed Oct. 11, 1921 3 Sheets-Sheet 2
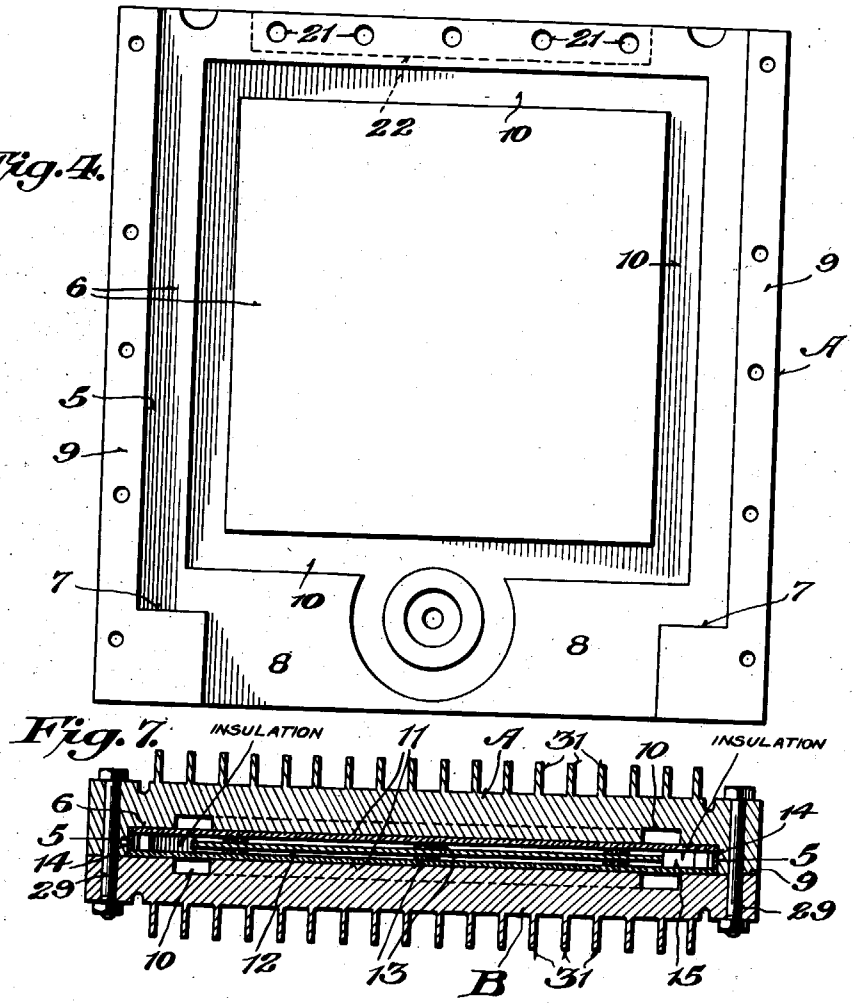
Fig. 4.
Fig. 7.
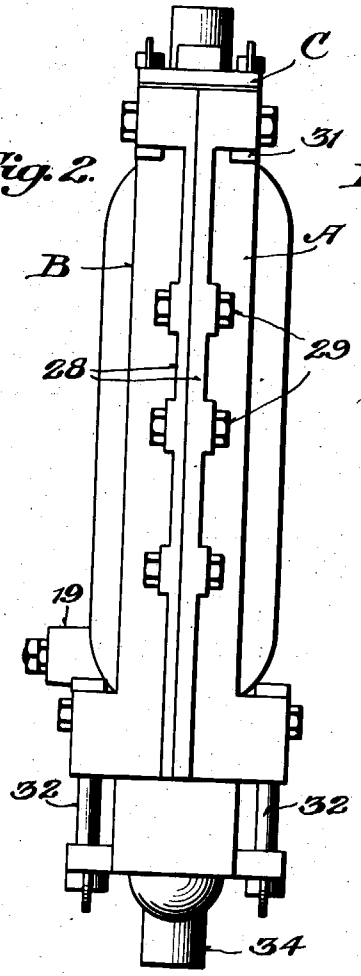
Fig. 2.
Inventor
H. B. Hartman,
By D. P. Wolcott
Attorney
WITNESSES:-
Chas. L. Gifestower
Emory L. Ruff July 29, 1924.

Re. 15,880

H. B. HARTMAN

OZONE GENERATOR

Original Filed Oct. 11, 1921 3 Sheets-Sheet 3

Inventor

H. B. Hartman,

WITNESSES:—

Chas. L. Grigsbauer

Emory R. Groff

By S. P. Wochandler

Attorney

Reissued July 29, 1924. Re. 15,880

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

OZONE GENERATOR.

Original No. 1,436,251, dated November 21, 1922, Serial No. 507,039, filed October 11, 1921. Application for reissue filed June 1, 1923. Serial No. 642,879.

*To all whom it may concern:*

Be it known that I, HARRY B. HARTMAN, a citizen of the United States, residing at Scottdale, in the county of Westmoreland and State of Pennsylvania, have invented certain new and useful Improvements in Ozone Generators, of which the following is a specification.

This invention relates to new and useful improvements in ozone generators.

In the present state of the art, the ozone generating unit is disposed in such a relation between the air inlet and the ozone oulet that the air and ozone travel in a circuitous path around the edges of the dielectrics. The air which is heated to an intense degree through the action of the electrode, acts on the edges and corners of the dielectrics and often causes these edges and corners to break off, thus lessening the life of the dielectrics. This condition is improved to some extent by the use of air and water cooling means.

The principal object of my invention is to provide an arrangement whereby the burning and consequent breaking off of the corners and edges of the dielectrics will be avoided. To this end I have provided a generator in which there is provided a straight passage from the air inlet past the generating unit and to the ozone outlet, whereby short circuiting of air currents is avoided and a more uniform distribution of air relative to the dielectrics is obtained.

Another object of my invention is to provide an air filter which is disposed between the air inlet and the ozone generator whereby all dust and particles of chemicals are removed from the air before the latter reaches the generating unit.

A further object of the invention is to provide a two-part casing for the generator in which one of the parts constitutes a holder for the generator.

A still further object of the invention is to provide a generator including a casing having one or more sight openings formed therein for viewing the action of the generating unit.

In the accompanying drawings:

Figure 2 is a side elevation thereof.

Figure 4 is a front elevation of the casing section which supports the generating unit, the unit being removed to better show the construction of said section.

Figure 7 is a horizontal sectional view taken on line 7—7 of Figure 1.

Like reference numerals designate corresponding parts throughout the several views.

Figure 1:
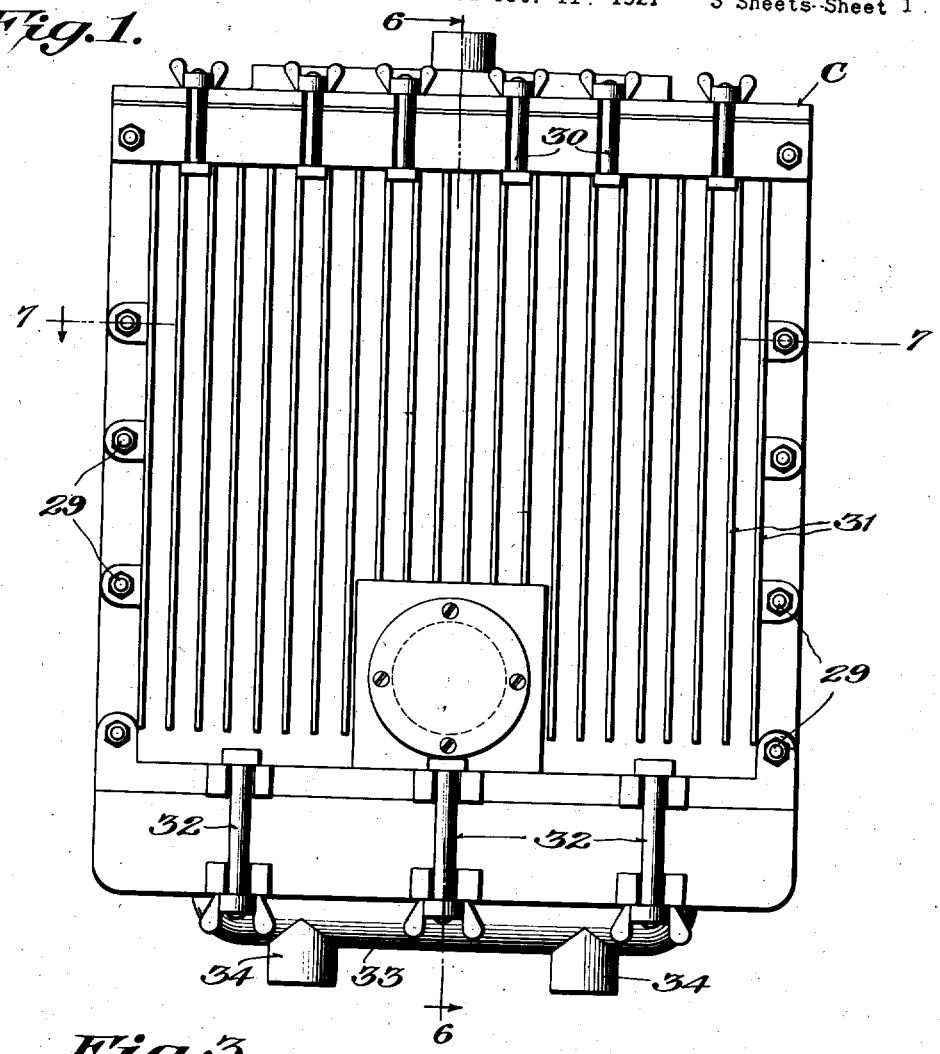
Figure 1 is a front elevation of an ozone generator constructed in accordance with my invention.
Figure 3:
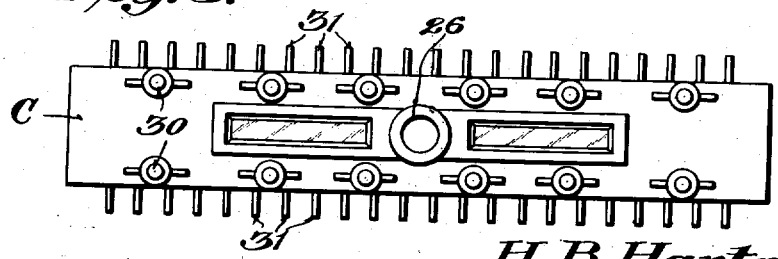
Figure 3 is a top plan view thereof.
Figure 6:
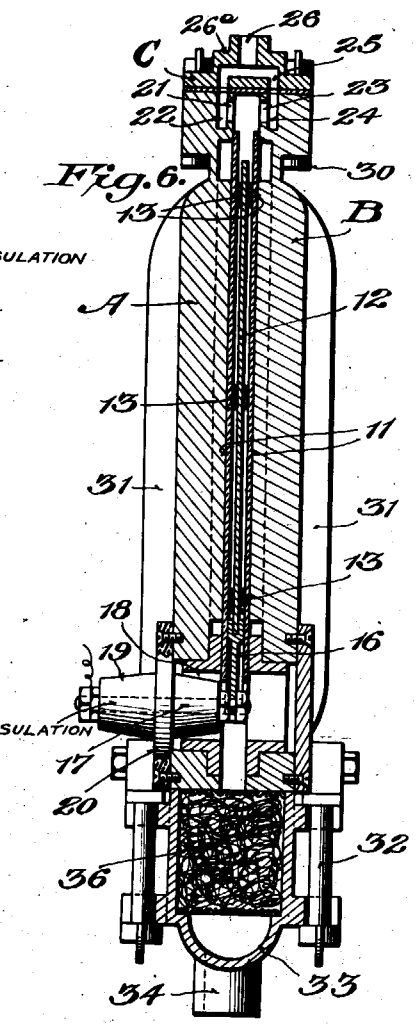
Figure 6 is a vertical sectional view taken on the line 6—6 of Figure 1.
Figure 5:
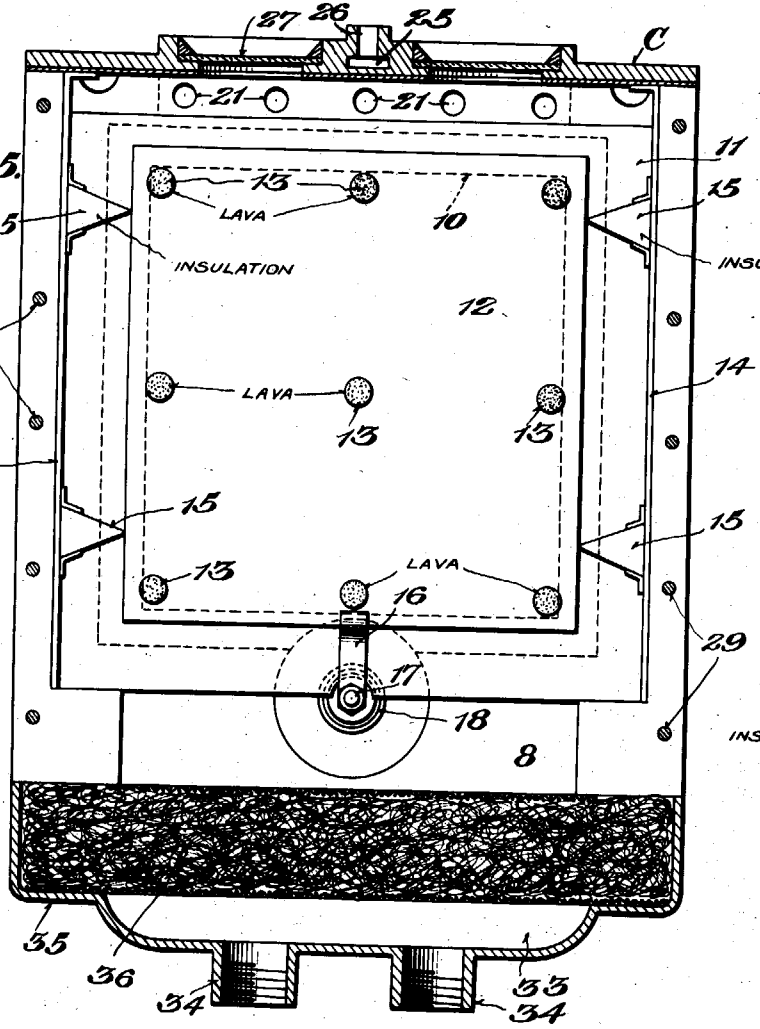
Figure 5 is a similar view but showing the generating unit assembled therein, the front dielectric being omitted.

Referring to the drawings, my improved ozone generator comprises a casing consisting of opposed sections A and B, the section A constituting a holder for the ozone generating unit and the section B constituting a cover therefor. The inner face of the section A is recessed as at 5 to form a flat face 6 disposed in a plane parallel with the abutting edges of the sections. This recess 5 forms at the lower end of the section spaced seats 7, 7 and an air inlet opening 8 located between said seats. The recess 5 forms resultant side walls 9, 9 which merge with the seats 7. Formed in the surface 6 is an annular endless channel 10 forming an air space or air-gap for a purpose hereinafter described. A similar channel $10^a$ is formed in the inner face of the section B.

The ozone generating unit is positioned within the recess 5 and consists of spaced dielectrics 11, 11 formed of glass, mica, or the like. These dielectrics are supported on the seats 7, 7 and fill the space between the walls 9, 9. Disposed between the dielectrics is an electrode 12 which may be formed of aluminum or any other suitable material. This electrode is centrally positioned within the recess 5 and is held in spaced relation to the dielectrics by means of a plurality of insulating buttons 13 which are preferably formed of lava. These buttons extend through corresponding openings formed in the electrode and engage the dielectrics so as to maintain the electrode in a position centrally between the same. In order to retain the electrode against endwise shifting movements I have provided at each side of the electrode a metallic strip 14 which is vertically disposed against the wall 9, and this strip carries a plurality of insulators 15, 15 which engage the adjacent edge of the electrode. In order to support these electrodes against downward movement, I have provided a connector link 16, the upper end of which engages the lower edge of the electrode. The lower end of the connector link 16 is connected to a binding post 17 which extends through an opening 18 formed in the casing A. This binding post is surrounded by an insulator 19 which extends into the opening 18 and the binding post and insulator are fixedly secured to the casing A by means of a plate 20. It will thus be seen that the connector link 16 not only forms a bottom support for the electrode but also constitutes a conductor for the current between the binding post 17 and the electrode. The channels 10 and 10[a] which form air spaces, extend in substantial parallelism to the outer edges of the dielectrics and are disposed in close proximity thereto so as to provide an additional cooling means therefor.

Formed in the upper part of the casing section A above the generating unit is a plurality of rearwardly extending or lateral outlet openings 21 for the ozone. These openings extend inwardly from the surface 6 of the recess 5 and communicate with a channel 22 extending at right angles and formed in the upper edge of the section A. Similar outlets 23 and a similar channel 24 are formed in the upper portion of the section B. A closure plate C is positioned above the sections A and B and is formed with openings 25, 25 which communicate with the respective channels 22 and 24. These openings 25 lead into a single opening 26 formed in a boss 26[a] carried by the closure plate C.

From the foregoing it will be observed that the air inlet opening 8 is positioned directly below the generating unit and that this air passes in a straight line to the generating unit and that the resultant ozone passes from the generating unit in a continued straight line to the ozone outlet 26.

Formed in the closure plate C is a plurality of sight openings 27, 27 which are disposed in alignment with the generating unit. These openings are covered with glass or other transparent material, and serve to permit inspection of the generating unit while it is in action.

The casing sections are respectively formed with meeting flanges 28, 28 which are secured together by bolts 29. The closure plate C is secured to the generator casing by a plurality of bolts 30. The casing sections A and B are each provided with a plurality of heat radiating ribs 31 which serve to cool the generator from the effects of the high current voltage which is necessarily used by the generating unit in producing the ozone.

Secured to the lower portion of the casing members A and B by bolts 32 is a supporting shell or holder 33 having one or more air inlet openings 34 formed in the bottom thereof. This shell or holder is provided with a seat 35 for supporting an air filter 36 which is made of cotton or other suitable material. This air filter is disposed between the air inlet openings 34 and the opening 8 of the casing. It will therefore be seen that the filter is disposed between the air inlet and the ozone generating unit. Suitable conections are made between the air inlet openings 34 and a dehydrator (not shown). Thus the dried air coming from the dehydrator will pass through the openings 34 into the shell 33, thence through the air filter where all dust and particles of chemicals will be removed, and thence upwardly in a straight line past the generating unit, the resultant ozone thence passing in a continued straight line to the ozone outlets.

From the foregoing it will be seen that the electrode and oppositely disposed dielectrics have their surface planes in substantial alignment with the air inlet and with the ozone outlet; and that the generating unit is positioned in perpendicular relation between said inlet and said outlet.

As a result of the above construction, the air which has been highly heated by the generating unit and the ozone which results from the generating unit will flow through the machine in a substantially straight path from the air inlet to the ozone outlet, and as a result, the heated air and ozone will be uniformly spread, and consequently the edges and corners of the dielectrics will not be burned and subsequently broken as a result thereof. Furthermore, by providing the air space or channels 10 and 10[a] in close proximity to the edges of the electrode, the edges thereof will be further protected against being burned by the heated air and resultant ozone and the insulating dielectric sheets will be protected against perforation or breaking down because of the absence of the concentrated brush discharge. Therefore it will be apparent that the grooves or channels 10 and 10[a] produce an enlarged air-gap adjacent the edge of the electrode 12, the said channel or groove being closed by the dielectric sheets 11—11.

Accordingly, it will be understood that the casing sections which surround the electrode are provided with a groove or channel which constitutes an air gap about the edge of the electrode which causes the brush discharge to taper off at the edge of said electrode in such a way as to avoid concentration which would otherwise cause the breaking down of the edge of the electrode and also the perforation of the insulating dielectric sheets.

What I claim as new is:—

1. The combination with a casing having an air inlet and an ozone outlet, of an ozone generating unit consisting of a pair of dielectric members and intermediate electrode arranged in spaced relation and supported in said casing to provide a straight flow of air from said inlet to said generating unit and for providing a continued straight flow of the resultant ozone to said outlet.

2. The combination with a casing having an air inlet and an ozone outlet, of an ozone generating unit supported in said casing and comprising an electrode and oppositely disposed dielectrics having their surface planes in substantial alignment with said inlet and outlet.

3. The combination with a casing having a lower air inlet and an upper ozone outlet, of an ozone generating unit consisting of a pair of dielectric members and intermediate electrode arranged in spaced relation and positioned in perpendicular relation between said inlet and said outlet.

4. In an ozone generator, the combination with a casing formed of opposed sections, one of said sections being centrally recessed and formed with an air inlet opening and an ozone outlet opening, of an ozone generating unit housed and supported in the recess of said section.

5. In an ozone generator, the combination with a casing formed of opposed sections, one of said sections being recessed and formed with an air inlet opening and ozone outlet opening, said recess forming resultant seats on opposite sides of said air inlet opening, and an ozone generating unit located in said recess and including a pair of spaced dielectrics supported on the seat formed by said recess.

6. In an ozone generator, the combination with a casing formed of opposed sections, one of said sections being recessed and formed with an air inlet opening and ozone outlet opening, said recess forming resultant seats on opposite sides of said air inlet opening, an ozone generating unit located in said recess and including a pair of spaced dielectrics and an intermediate electrode, said dielectrics being supported on the seat formed by said recess, and means for supporting and insulating said electrode.

7. In an ozone generator, the combination with a casing formed of opposed sections, one of said sections being recessed and formed with an air inlet opening and ozone outlet opening, said recess forming resultant seats on opposite sides of said air inlet opening, an ozone generating unit located in said recess and including a pair of spaced dielectrics and an intermediate electrode, said dielectrics being supported on the seat formed by said recess, means for supporting said electrode, and insulated buttons secured to said electrode and engaging said dielectrics to maintain said electrode and dielectrics in spaced relation.

8. In an ozone generator, the combination with a casing formed of opposed sections, one of said sections being recessed and formed with an air inlet opening and ozone outlet opening, said recess forming resultant seats on opposite sides of said air inlet opening, an ozone generating unit located in said recess and including a pair of spaced dielectrics and an intermediate electrode, said dielectrics being supported on the seat formed by said recess, insulating means positioned between the walls of the recess and the edges of the electrode, and means connected with the bottom edge of the electrode for supporting the latter.

9. In an ozone generator, the combination with a casing having an air inlet and an ozone outlet, of an ozone generating unit supported in said casing between said inlet and said outlet, and an air filter disposed between said air inlet and said generating unit.

10. In an ozone generator, the combination with a casing having an air inlet and an ozone outlet, of an ozone generating unit supported in said casing to provide a straight flow of air from said inlet to said generating unit and for providing a continued straight flow of the resultant ozone to said outlet, and an air filter disposed between said air inlet and said generating unit.

11. In an ozone generator, the combination with a casing having an air inlet and ozone outlet, of an ozone generating unit supported in said casing and comprising an electrode and oppositely disposed dielectrics having their surface planes in substantial alignment with said inlet and outlet, and an air filter disposed between said air inlet and said generating unit.

12. In an ozone generator, the combination with a casing having a lower air inlet and an upper ozone outlet, of an ozone generating unit positioned in perpendicular relation between said inlet and said outlet, and an air filter disposed between said air inlet and said generating unit.

13. In an ozone generator, the combination with a casing formed of opposed sections, one of said sections being recessed and formed with a lower air inlet opening and an upper ozone outlet opening, of an ozone generating unit supported in the recess of said section, a shell connected to the lower portions of said sections and having an inlet opening formed therein, and an air filter supported in said shell between the air inlet opening of the casing and the air inlet opening of the shell.

14. In an ozone generator, the combination with a casing having an air inlet and an ozone outlet, of an ozone generating unit supported in said casing and comprising an electrode and oppositely disposed dielectrics having their surface planes in substantial alignment with said inlet and outlet, said casing being provided with endless air channels arranged in alignment with and disposed in close proximity to the edges of the dielectrics.

15. In an ozone generator, the combination with a casing formed of opposed sections, one of said sections being recessed and formed with an air inlet opening and ozone outlet opening, said recess forming resultant seats on opposite sides of said air inlet opening, and an ozone generating unit located in said recess and including a pair of spaced dielectrics supported on the seat formed by said recess, said sections being respectively formed with endless air channels arranged in alignment with and disposed in close proximity to the edges of the dielectrics.

16. In an ozone generator, the combination with a casing formed of opposed sections, one of said sections being recessed and formed with a lower air inlet opening, said sections being each formed at its upper end with an ozone outlet opening, an ozone generating unit located in said recess, and a closure plate secured to the top of the sections and formed with an ozone outlet communicating with said ozone outlet openings of the casing.

17. In an ozone generator, the combination with a casing formed of opposed sections, one of said sections being recessed and formed with a lower air inlet opening, said sections being each formed at its upper end with an ozone outlet opening, an ozone generating unit located in said recess, and a closure plate secured to the top of the sections and provided with a window for viewing the action of the generating unit.

18. An ozone generator, including a pair of relatively separable sections having openings at opposite edges thereof, an ozone generating unit arranged between said sections, an air filtering unit clamped to one of said openings, and a closure plate fitted to the other of said openings.

19. An ozone generator, including a pair of relatively separable sections having openings at opposite edges thereof, an ozone generating unit arranged between said sections, an air filtering unit clamped to one of said openings, and a closure plate having a delivery outlet and inspection windows fitted to the other of said openings.

20. An ozone generator, including a casing, and an ozone generating unit arranged within the casing, said casing being provided with an insulating air channel located at opposite sides of the edges of one of the members of the generating unit thereby to provide an insulating air space.

21. An ozone generator, including complemental casing sections having grooves formed in adjacent faces thereof, an ozone generating unit clamped between said sections and one of the members of said generating unit terminating within the limits of said grooves in the casing sections.

22. An ozone generator including complemental casing sections having grooves formed in the adjacent faces thereof, an ozone generating unit clamped between the adjacent faces of the sections and consisting of dielectric plates overlying said grooves, and an intermediate electrode plate of less area than the dielectric plates whereby its edge portions terminate within the limits of said grooves.

23. In an ozone generator the combination of an ozone generating unit consisting of generating plates and a casing having an insulating air channel lying opposite the edges of one of said plates.

24. An ozone generator including an electrode, and a casing constructed to provide an enlarged air gap about the edge of the electrode.

25. An ozone generator including an electrode, a casing having an enlarged air gap adjacent the edge of the electrode, and a dielectric crossing the air gap.

26. An ozone generator including an electrode, and a casing formed with a groove producing an enlarged air gap adjacent the edge of the electrode and a dielectric crossing the gap.

In testimony whereof I hereunto affix my signature in the presence of two witnesses.

HARRY BUXTON HARTMAN.

Witnesses:

JOSEPH R. STAUFFER,

F. E. HARTMAN.